W. H. Bliss,
Hose Coupling.
Nº 34,476.          Patented Feb. 25, 1862.
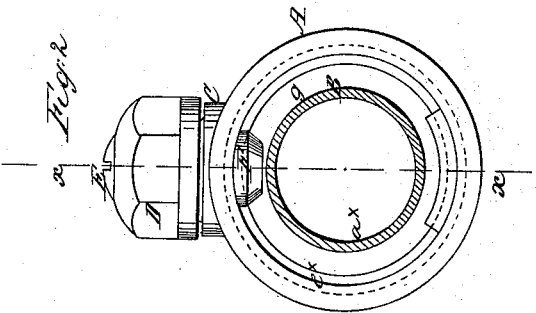
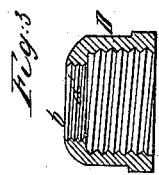 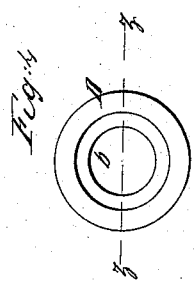
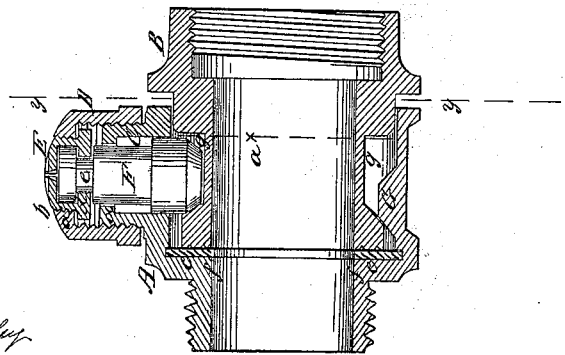
Witnesses
James Laird
Richardson Gawley
Inventor
W H Bliss

UNITED STATES PATENT OFFICE.

WILLIAM H. BLISS, OF NEWPORT, RHODE ISLAND.

IMPROVEMENT IN HOSE-COUPLINGS.

Specification forming part of Letters Patent No. 34,476, dated February 25, 1862.

*To all whom it may concern:*

Be it known that I, WILLIAM H. BLISS, of Newport, in the county of Newport and State of Rhode Island, have invented a new and Improved Hose-Coupling; and I do hereby declare that the following is a full, clear, and exact description of the same, reference being had to the accompanying drawings, making a part of this specification, in which—

Figure 1 is a longitudinal central section of my invention, taken in the line $x\ x$, Fig. 2; Fig. 2, a transverse section of the same, taken in the line $y\ y$, Fig. 1; Fig. 3, a detached central section of a nut pertaining to the same, taken in the line $z\ z$, Fig. 4; Fig. 4, an inverted plan of the same.

Similar letters of reference indicate corresponding parts in the several figures.

This invention relates to certain improvements in a hose-coupling for which Letters Patent were granted to Robert P. Lawton and William H. Bliss, the latter being the party to the present application, said Letters Patent bearing date February 22, 1859.

The object of the within-described invention is twofold: First, to obtain a better means for connecting the nut with a pin, which is forced by the nut and a screw into a recess in one of the butts in order to secure the two butts together, and, second, to obtain a more secure or a firmer connection of the two butts with but a single pin, as hereinafter fully shown and described.

To enable those skilled in the art to fully understand and construct my invention, I will proceed to describe it.

A B represent two metal butts, which are secured to the ends of the hose in the usual or in any proper way. These butts are of cylindrical form, and one of them A is provided externally with a tubular projection C, which has a screw $a$ cut in its outer surface, as shown clearly in Fig. 1.

D is a nut which is fitted on the screw $a$, and is allowed to work freely thereon. This nut has a circular opening $b$ in its top, and said opening has an internal screw $a'$ to receive a screw $b'$ on the outer surface of a collar E. The collar E is formed of two distinct equal parts $c\ c$, the lower edges of which are provided with a flange $d$, which projects beyond both sides of the parts, as shown clearly in Fig. 1.

F is a cylindrical pin, which is fitted within the tubular projection C, and is allowed to slide freely therein. The pin F, near its outer end, has a groove $e$ made circumferentially in it, and this groove receives the inner edges of the flanges $d\ d$ of the collar E, the outer end of the pin being within the collar. The collar E, it will be seen, is connected to the nut D by the screw-threads $a'\ b'$, and by turning the nut D the pin F may be forced inward or drawn out from within the butt A.

Within the butt A, and at a point opposite to the pin F, there is a lug G, which is simply a projecting piece of metal having inclined surfaces at its outer and inner edges, as shown in Fig. 1. This lug G may be cast with the butt A or made separately, and secured to it by brazing or other means.

The butt B is so formed that its outer part $a^x$ will fit within the butt A, and an annular packing $e^x$ is placed within the butt A against a shoulder $f$ for the end of the butt B to bear against and form a water-tight joint. (See Fig. 1.) The part $a^x$ of the butt B has a groove $g$ made in it circumferentially. This groove extends entirely around the part $a^x$, and it receives the inner end of the pin F when the latter is forced inward under the action of the nut D and screw $a$ of the tubular projection C.

The pin F, it will be seen, has a beveled or taper inner end, and the front side of the groove $g$ is inclined outward from its inner to its outer edge, as shown in Fig. 1. Hence when the pin F is forced within the groove $g$ the end of the butt B will be brought in close contact with the packing $e$, and a close or water-tight joint obtained. The lug G, in consequence of having its inner edge inclined, also has the same tendency to press the butt B against the packing $e^x$, the lug fitting in groove $g$. The outer edge of the lug is inclined, in order to facilitate the insertion of the part $a^x$ of the butt B within A. This mode of connection, it will be seen, affords a swivel-joint, as the butts are allowed to turn freely after the connection is made, the pin F being free to rotate, thereby preventing friction. The lug G is very essential, as it forms a bearing directly opposite the pin F and insures a firm connection of the two butts. Without the lugs G a plurality of pins F would be required, and that would considerably augment the cost of construction and also add materially to the manipulation in connecting and disconnecting the butts.

In consequence of connecting the pin F to the nut D by means of the divided collar E, the pin F is prevented from being worn or cut, a contingency which occurs in the original mode of connection, as shown in the patent of Lawton and Bliss, previously alluded to, a pin being used, which passes laterally through the nut and into the groove $e$ of the pin.

The pin F of my invention may be detached from the butt A at any time by pressing the thumb against the inner end of the pin F and pressing the forefinger on the upper end of the collar E, and then unscrewing the nut D.

I do not claim the pin F of the butt A and groove $g$ of the butt B for securing the two butts together, for that is old and may be seen in the patented hose-coupling of Lawton and Bliss herein referred to; but I do claim as new and desire to secure by Letters Patent—

1. Connecting the nut D with the pin F by means of the divided collar E, fitted in the nut and to the pin, substantially as shown and described, when said connection is used in combination with the pin F and the groove $g$ of butt B, for the purpose specified.

2. The lug G within the butt A, when used in connection with the pin F and the groove $g$ of the butt B, substantially as and for the purpose set forth.

W. H. BLISS.

Witnesses:
JAMES LAIRD,
RICHARDSON GAWLEY.